(No Model.) 3 Sheets—Sheet 1.
G. C. FERGUSON.
BEEHIVE.
No. 546,007. Patented Sept. 10, 1895.
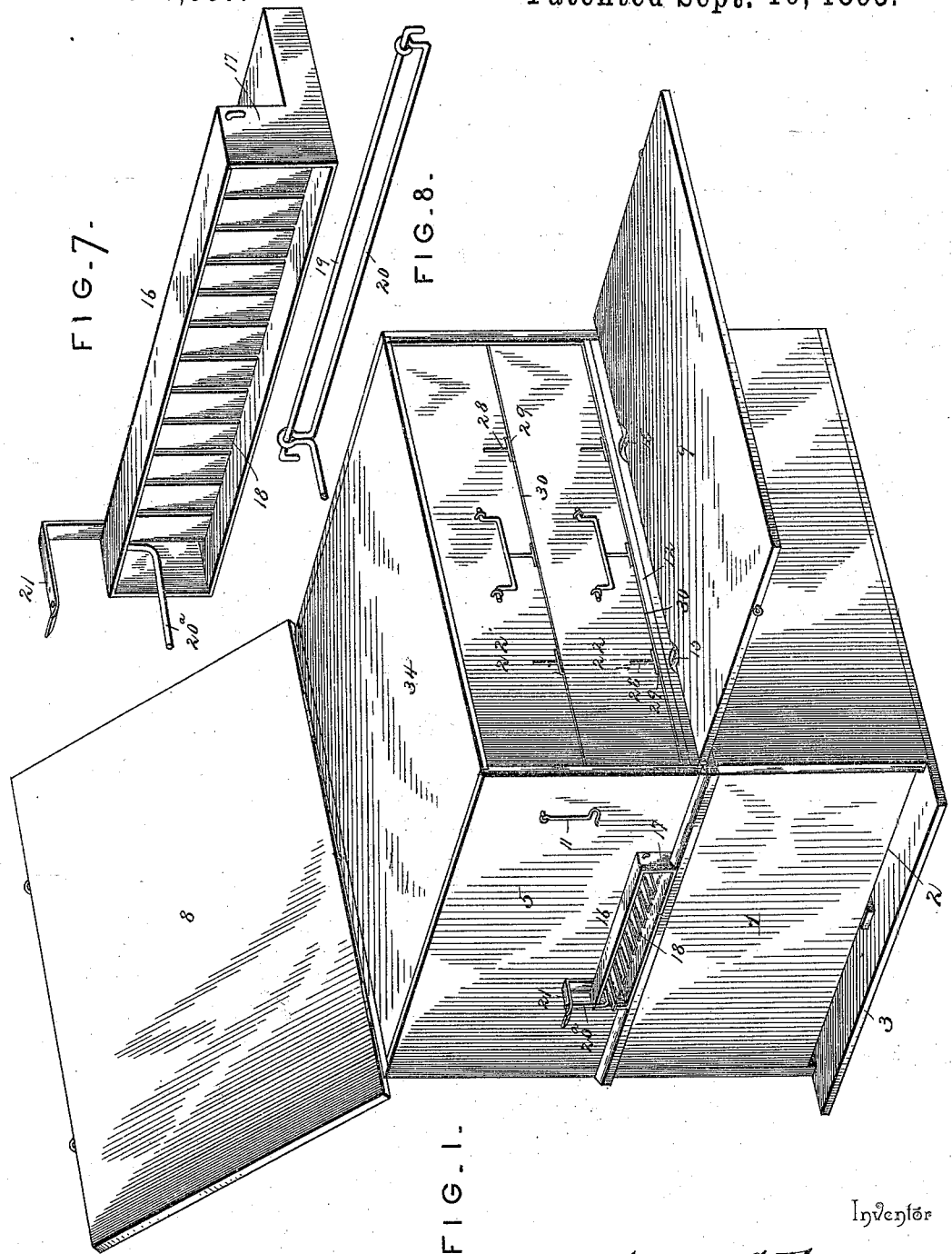
Witnesses
Harry L. Amer.
H. J. Riley
Inventor
George C. Ferguson,
By his Attorneys.
C. A. Snow & Co.

(No Model.)  3 Sheets—Sheet 2.
G. C. FERGUSON.
BEEHIVE.
No. 546,007.  Patented Sept. 10, 1895.
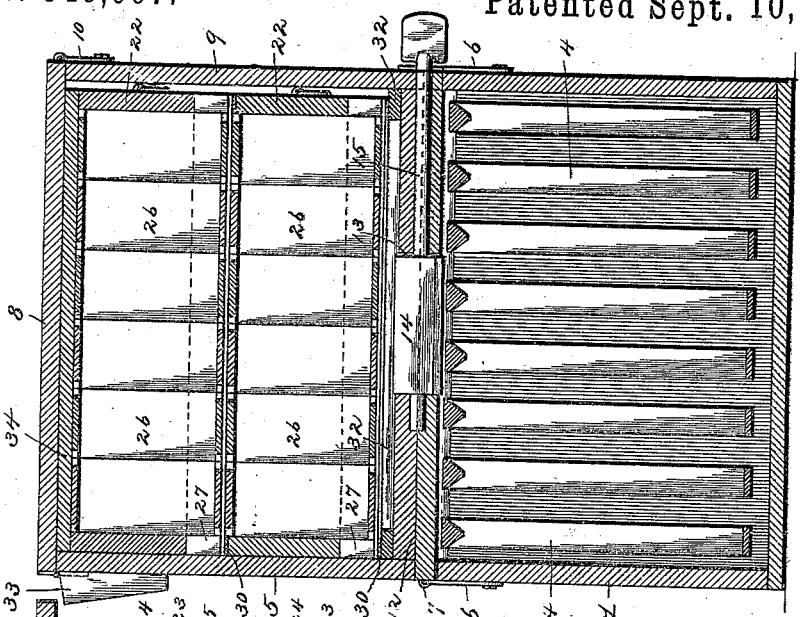
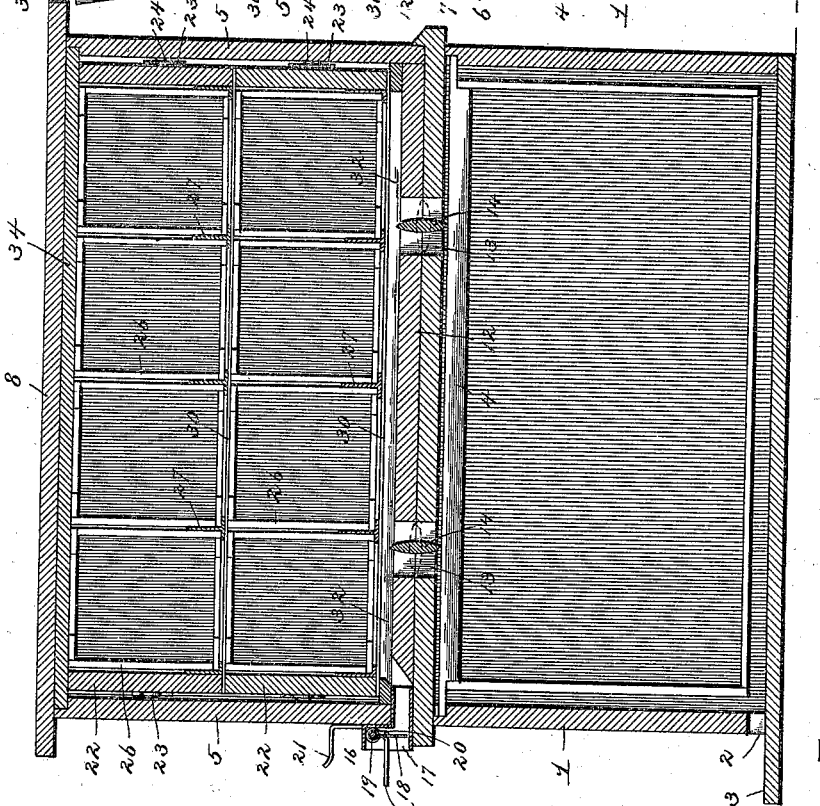
Witnesses
Harry L. Amer.
J. F. Riley
Inventor
George C. Ferguson,
By his Attorneys,
C. A. Snow & Co.

(No Model.) 3 Sheets—Sheet 3.
G. C. FERGUSON.
BEEHIVE.
No. 546,007. Patented Sept. 10, 1895.
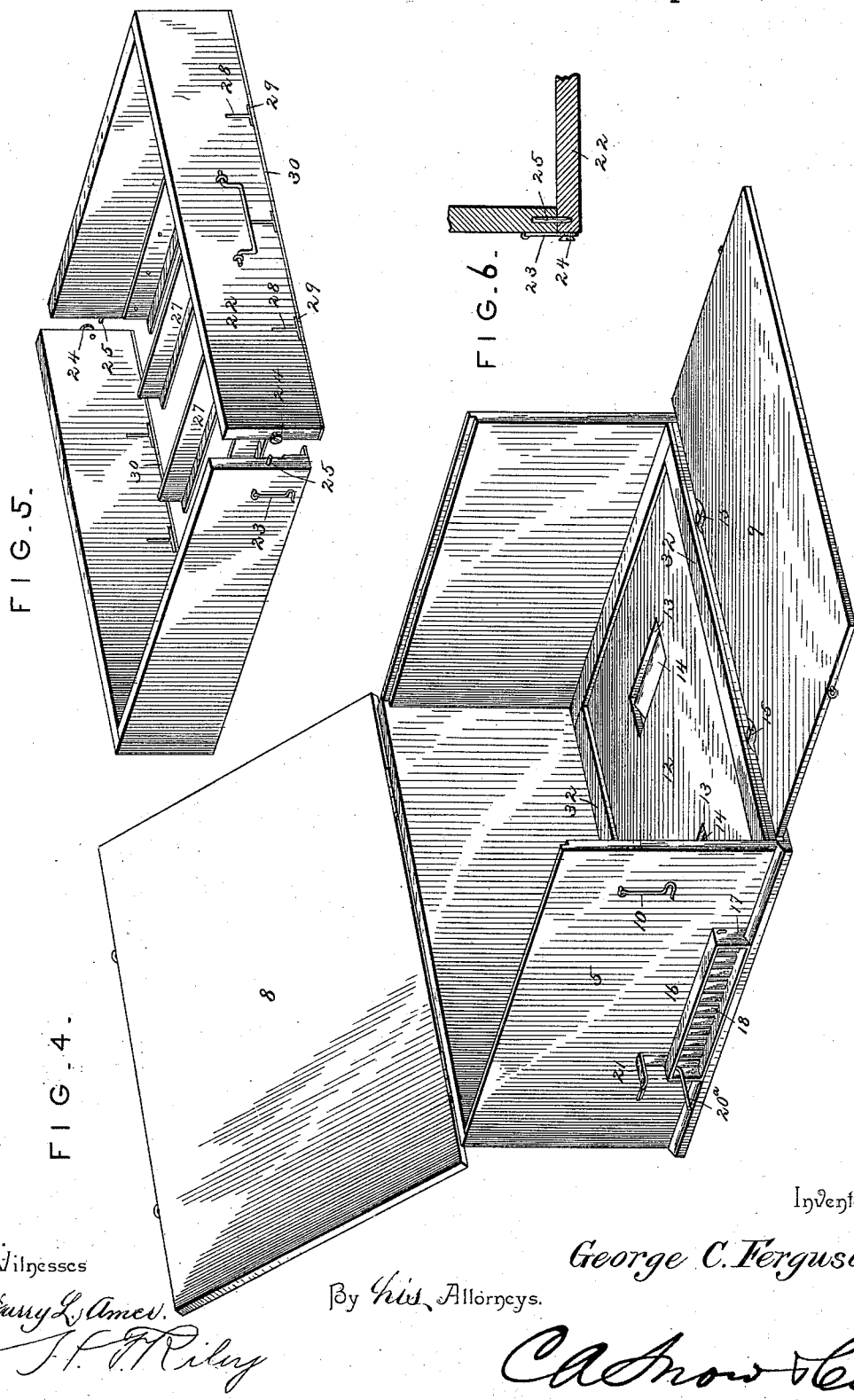
Witnesses
Harry L. Ames.
J. F. Riley
Inventor
George C. Ferguson.
By his Attorneys.
C. A. Snow & Co.

UNITED STATES PATENT OFFICE.

GEORGE C. FERGUSON, OF ODELL, NEBRASKA, ASSIGNOR OF ONE-HALF TO MATHIAS OSWALD, OF SAME PLACE.

BEEHIVE.

SPECIFICATION forming part of Letters Patent No. 546,007, dated September 10, 1895.

Application filed February 28, 1895. Serial No. 540,093. (No model.)

*To all whom it may concern:*

Be it known that I, GEORGE C. FERGUSON, a citizen of the United States, residing at Odell, in the county of Gage and State of Nebraska, have invented a new and useful Beehive, of which the following is a specification.

The invention relates to improvements in beehives.

The object of the present invention is to improve the construction of beehives, to provide means for controlling the passage of bees to the super and of permitting their escape therefrom and of preventing their return, and to enable the honey-sections to be readily handled and conveniently removed from the super and from the trays.

The invention consists in the construction and novel combination and arrangement of parts hereinafter fully described, illustrated in the accompanying drawings, and pointed out in the claims hereto appended.

In the drawings, Figure 1 is a perspective view of a hive constructed in accordance with this invention, the bee-escape of the super being open. Fig. 2 is a central vertical longitudinal sectional view. Fig. 3 is a transverse sectional view. Fig. 4 is a detail perspective view of the super, the cover being raised and the hinged side or drop-door being open. Fig. 5 is a detail perspective view of one of the honey-section trays. Fig. 6 is a detail sectional view of the same. Fig. 7 is a detail perspective view of the bee-escape of the super. Fig. 8 is a detail view of the loop and pintle of the bee-escape of the super.

Like numerals of reference indicate corresponding parts in all the figures of the drawings.

1 designates a hive-body, having a bee entrance or opening 2, and provided with a projecting alighting-ledge 3, and containing brood-frames 4 of the desired construction. Upon the hive-body 1 is mounted a super 5, secured detachably to the hive-body by hooks 6 and eyes 7. The super is substantially rectangular and is provided with a hinged cover 8 and a hinged side or drop-door 9, and the cover and drop-door or side 9 are secured, when closed, by hooks and eyes 10 and 11.

The bottom 12 of the super is composed of two thicknesses of material or boards and is provided with openings 13, forming bee entrances or passages to permit access of the bees to the super, and mounted in the openings are pivoted cut-offs 14. The cut-offs 14 are oppositely beveled to enable them to readily cut their way through any wax that may accumulate at the openings. The rotary or pivoted cut-offs 14 are provided with stems 15, terminating in handles and mounted in grooves of the boards of which the bottom is composed, whereby the stems are protected from the secretion of the bees. The cut-offs may be closed to prevent the access of bees to the super, and those bees within the super are allowed to escape, and for this purpose a bee-escape 16 is provided for the super. The bee-escape 16 consists of a substantially L-shaped casing 17, forming a low passage-way, and a swinging door 18, mounted in the enlarged outer portion of the casing and hinged at its top by means of a pintle 19. The upwardly-swinging door is composed of a series of separate sections, each provided with an eye for the reception of a pintle. When the door is closed, the sections are sufficiently light to enable them to be readily swung outward to permit the passage of a bee; but they are prevented from swinging inward past a perpendicular by the reduced portion of the casing, and after a bee has passed out through the bee-escape it cannot re-enter when the door is closed. The door 18 may be held open by a loop 20, provided at its ends with eyes to receive the pintle and located in rear of the sections of the door and provided with an arm $20^a$, arranged to engage an opening of a substantially L-shaped resilient catch 21.

The honey-sections are arranged in honey-section trays 22, oblong and composed of two L-shaped members connected at their adjacent ends by hooks 23 and projections or lugs 24 engaged by the hooks, and the contiguous ends of the members are also provided with dowel-pins 25. The honey-sections 26 are supported by flanged supporting-bars 27, inverted-T-shaped in cross-section and having their terminals arranged in kerfs 28 and recesses 29 of the sides of the tray and supported by metal strips 30, secured to the lower edges of the sides. Any number of trays may be employed, and the lowermost one rests upon cleats 32 of the bottom of the super, and the top one is covered by a removable board or plate 34. The cover is supported, when open, by a bracket or stop 33, mounted on the super and located on the outer face of the side to which the cover is hinged.

It will be seen that the beehive is simple and inexpensive in construction, that the passage of bees to the super may be controlled, and that after communication between the brood-chamber and the super has been shut off the bees are permitted to escape from the latter and may be prevented from returning. It will also be seen that the honey-sections are compactly arranged in the super and may be readily removed therefrom and from the trays.

Changes in the form, proportion, and the minor details of construction may be resorted to without departing from the principle or sacrificing any of the advantages of this invention.

What I claim is—

1. A bee escape comprising a casing substantially L-shaped, having an inner reduced portion and an outer enlarged portion, an upwardly swinging door hinged in the enlarged portion of the casing at the top thereof, and having its inward swing limited by the reduced inner portion of the casing and composed of a series of independent sections, combined with means for simultaneously raising the sections and for holding them elevated to open the door, substantially as described.

2. A bee escape, comprising a substantially L-shaped casing, a door hinged at its top at the outer portion of the casing and composed of separate independently swinging sections, a hinged loop mounted in rear of the sections and arranged to swing upward to hold the door open, and provided with an arm, and a catch for engaging the arm for holding the door open, substantially as described.

3. A super, having a bottom provided with an opening, and composed of two boards having opposite grooves at their inner faces located at opposite ends of the openings, and a pivoted cutoff arranged in said opening and having beveled cutting edges, and provided with a stem located between said boards and fitting in the grooves thereof, substantially as described.

In testimony that I claim the foregoing as my own I have hereto affixed my signature in the presence of two witnesses.

GEORGE C. FERGUSON.

Witnesses:
CHARLES E. BAKER,
MATHIAS OSWALD.